US011261366B2

(12) United States Patent
Shumway (10) Patent No.: US 11,261,366 B2
(45) Date of Patent: Mar. 1, 2022

(54) BARRIER PILLS CONTAINING VISCOELASTIC SURFACTANT AND METHODS FOR USING THE SAME

(71) Applicant: HALLIBURTON ENERGY SERVICES, INC., Houston, TX (US)

(72) Inventor: William Walter Shumway, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 48 days.

(21) Appl. No.: 16/480,003

(22) PCT Filed: Feb. 26, 2018

(86) PCT No.: PCT/US2018/019630
§ 371 (c)(1),
(2) Date: Jul. 23, 2019

(87) PCT Pub. No.: WO2018/160476
PCT Pub. Date: Sep. 7, 2018

(65) Prior Publication Data
US 2019/0367798 A1 Dec. 5, 2019

Related U.S. Application Data

(60) Provisional application No. 62/466,514, filed on Mar. 3, 2017.

(51) Int. Cl.
*E21B 41/00* (2006.01)
*C09K 8/506* (2006.01)
(Continued)

(52) U.S. Cl.
CPC ............ *C09K 8/506* (2013.01); *C09K 8/5045* (2013.01); *C09K 8/516* (2013.01); *E21B 33/134* (2013.01);
(Continued)

(58) Field of Classification Search
None
See application file for complete search history.

(56) References Cited

U.S. PATENT DOCUMENTS 4,441,556 A * 4/1984 Powers ................ E21B 33/134
166/290
2004/0256113 A1 12/2004 Logiudice
(Continued)

FOREIGN PATENT DOCUMENTS

CN 105658906 B1 11/2019
WO 2013090037 A1 6/2013
(Continued)

OTHER PUBLICATIONS

International Search Report and Written Opinion dated Jun. 8, 2018 for PCT Application No. PCT/US2018/019630 filed Feb. 26, 2018.

*Primary Examiner* — Andrew Sue-Ako
(74) *Attorney, Agent, or Firm* — Chamberlain Hrdlicka (57) ABSTRACT

Methods for separating fluids with a barrier pill within a downhole environment are provided. The method includes introducing a barrier pill fluid into the wellbore containing a first fluid to form the barrier pill on top of the first fluid in the wellbore and introducing a second fluid into the wellbore. The barrier pill separates the first fluid and the second fluid. The barrier pill includes a viscoelastic surfactant and an aqueous fluid, such as a brine containing water and about 5 wt % to about 50 wt % of a salt.

19 Claims, 1 Drawing Sheet

(51) Int. Cl.
*C09K 8/504* (2006.01)
*C09K 8/516* (2006.01)
*E21B 33/134* (2006.01)
*C09K 8/40* (2006.01)

(52) U.S. Cl.
CPC ............... E21B 41/00 (2013.01); *C09K 8/40* (2013.01); *C09K 2208/30* (2013.01)

(56) References Cited

U.S. PATENT DOCUMENTS

| | | | |
|---|---|---|---|
| 2007/0295368 A1* | 12/2007 | Harrison | C11D 3/2093 134/42 |
| 2008/0007423 A1 | 1/2008 | Krueger | |
| 2009/0143256 A1* | 6/2009 | Welton | C09K 8/506 507/218 |
| 2010/0263863 A1* | 10/2010 | Quintero | C09K 8/40 166/267 |
| 2010/0298175 A1* | 11/2010 | Ghassemzadeh | C09K 8/516 507/124 |
| 2011/0024113 A1* | 2/2011 | Chen | C09K 8/40 166/292 |
| 2011/0259612 A1 | 10/2011 | Lovorn et al. | |
| 2012/0252705 A1 | 10/2012 | Sarap et al. | |
| 2014/0113843 A1 | 4/2014 | Shumway | |
| 2014/0116701 A1* | 5/2014 | Tang | C09K 8/725 166/292 |
| 2014/0262268 A1 | 9/2014 | Kageler | |
| 2014/0323361 A1* | 10/2014 | Livanec | C09K 8/035 507/120 |
| 2014/0354395 A1 | 12/2014 | Tavernier | |
| 2016/0009977 A1* | 1/2016 | Lu | C09K 8/03 166/300 |

FOREIGN PATENT DOCUMENTS

| | | |
|---|---|---|
| WO | 2016001174 A1 | 1/2016 |
| WO | 2016130110 A1 | 8/2016 |

* cited by examiner

BARRIER PILLS CONTAINING VISCOELASTIC SURFACTANT AND METHODS FOR USING THE SAME

BACKGROUND

This section is intended to provide relevant background information to facilitate a better understanding of the various aspects of the described embodiments. Accordingly, it should be understood that these statements are to be read in this light and not as admissions of prior art.

In underbalanced and managed pressure drilling and completion operations, it is often beneficial to be able to maintain precise control over pressures and fluids exposed to drilled-through formations and zones. In the past, specialized equipment (e.g., downhole deployment valves or snubbing units) have been utilized to provide for pressure control in certain situations, such as when tripping pipe, running casing or liner, wireline logging, or installing completions. However, this specialized equipment may be subject to failure, can be time-consuming and expensive to install and operate, and may not be effective in certain operations. For example, downhole deployment valves have been known to leak and snubbing units are ineffective to seal about slotted liners.

In addition to, or in lieu of, the specialized equipment, other approaches have involved the use of thixotropic fluids to form a barrier spacer or a "barrier pill". The barrier pill can be used to maintain a column of a low density fluid below a column of a high density fluid. If the barrier pill was not introduced, the fluid with the greater density would sink to the bottom of the wellbore. However, the materials used in barrier pills often lack sufficient strength or are prone to degradation in wellbore conditions to maintain a barrier between two fluids.

Therefore, there is a need for a method producing a barrier pill in a wellbore.

BRIEF DESCRIPTION OF THE DRAWINGS

Embodiments of the invention are described with reference to the following FIGURES. The same numbers are used throughout the FIGURES to reference like features and components. The features depicted in the figures are not necessarily shown to scale. Certain features of the embodiments can be shown exaggerated in scale or in somewhat schematic form, and some details of elements may not be shown in the interest of clarity and conciseness.

DETAILED DESCRIPTION

Embodiments provide barrier pills and method for forming a barrier pill in a wellbore within a downhole environment. The exemplary barrier pills discussed and disclosed herein may directly or indirectly affect one or more components or pieces of equipment associated with the preparation, delivery, recapture, recycling, reuse, and/or disposal of the disclosed barrier pills. For example, and with reference to FIG. 1, the disclosed barrier pills may directly or indirectly affect one or more components or pieces of equipment associated with an exemplary wellbore drilling system 100, according to one or more embodiments. It should be noted that while FIG. 1 generally depicts a land-based drilling assembly, those skilled in the art will readily recognize that the principles described herein are equally applicable to subsea drilling operations that employ floating or sea-based platforms and rigs, without departing from the scope of the disclosure.

Figure 1:
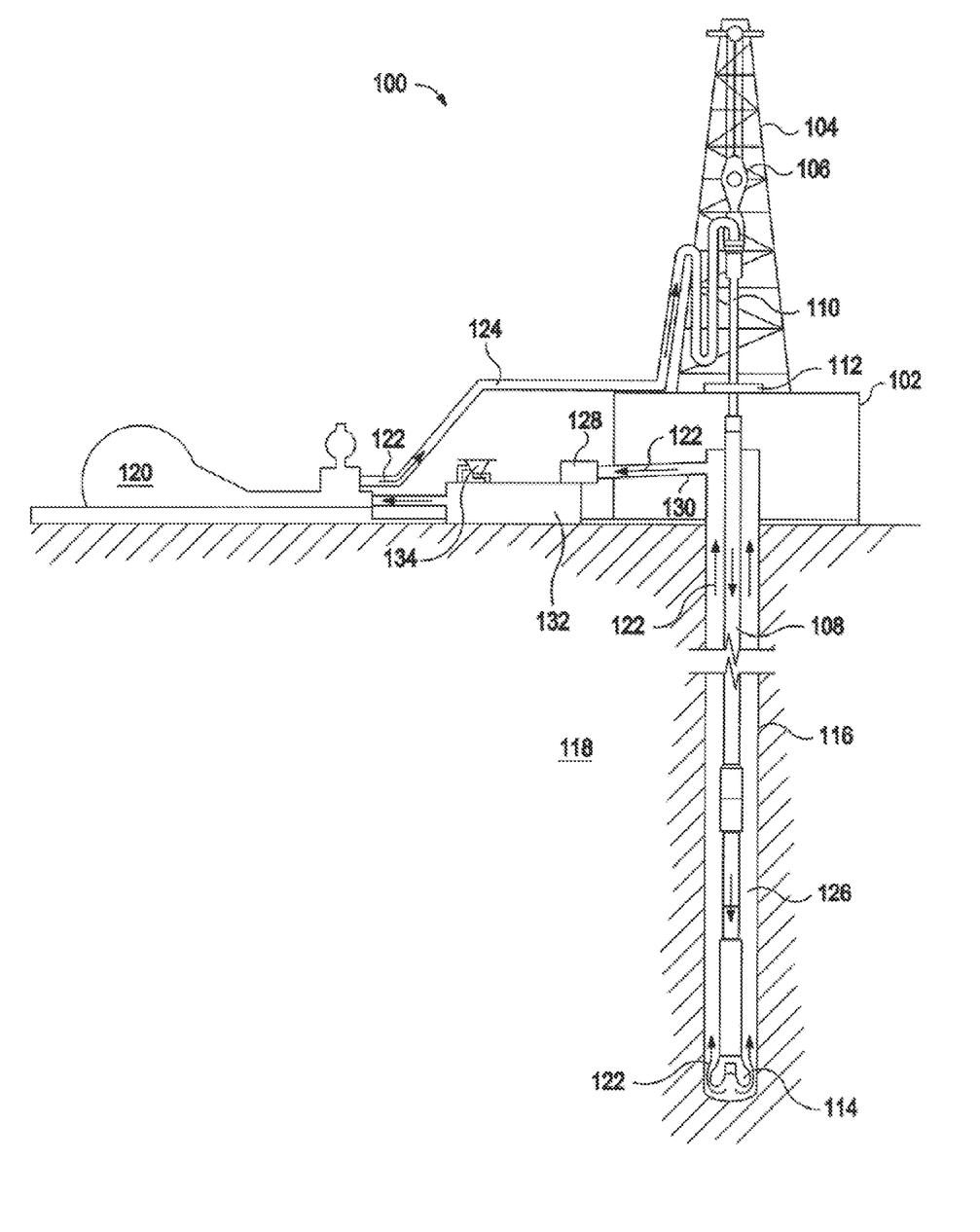
FIG. 1 is a schematic view of a drilling system that uses a barrier pill in a wellbore, according to one or more embodiments.

As illustrated, the drilling system 100 includes a drilling platform 102 that supports a derrick 104 having a traveling block 106 for raising and lowering a drill string 108. The drill string 108 includes, but is not limited to, drill pipe and coiled tubing. A kelly 110 supports the drill string 108 as it is lowered through a rotary table 112. A drill bit 114 is attached to the distal end of the drill string 108 and is driven either by a downhole motor and/or via rotation of the drill string 108 from the well surface. As the drill bit 114 rotates, the drill bit 114 produces a wellbore 116 that penetrates various subterranean formations 118. Although the wellbore 116 shown in FIG. 1 is a vertical wellbore, the barrier pills and methods discussed and described herein can also be implemented in other wellbore orientations. For example, the barrier pills and methods discussed and described herein can be adapted for horizontal wellbores, slant wellbores, curved wellbores, vertical wellbores, or any combination thereof.

The drill string 108 can be or include, but is not limited to, one or more pipes (e.g., jointed drill pipe, hard wired drill pipe, or other deployment hardware), strings, tubulars, coiled tubings, slicklines, wireline cables, tractors, a kelly, a bottom hole assembly (BHA), other conveyance devices, or any combination thereof. The BHA on the drill string 108 can include, but is not limited to, one or more of drill bits 114, drill collars, valves, sensors, logging tools, other components, and/or any combination thereof. For example, the downhole end of the drill string 108 includes the drill bits 114 (as shown) and one or more valves (not shown) for controlling the flow of the fluid 122.

A pump 120 (e.g., a mud pump) circulates one or more fluids 122 through a feed pipe 124 and to the kelly 110, which conveys the fluid 122 downhole through the interior of the drill string 108 and through one or more orifices in the drill bit 114. The fluid 122 can be or include, but is not limited to, one or more of drilling fluids, barrier pill fluids, treatment fluids, weighted fluids, production fluids, formation fluids, fracturing fluids, other downhole or annular fluids, or any combination thereof. The fluid 122 is then circulated back to the surface via an annulus 126 defined between the drill string 108 and the walls of the wellbore 116. At the surface, the recirculated or spent fluid 122 exits the annulus 126 and can be conveyed to one or more fluid processing units 128 via an interconnecting flow line 130. After passing through the fluid processing unit 128, a "cleaned" fluid 122 is deposited into a nearby retention pit 132 (e.g., a mud pit). While illustrated as being arranged at the outlet of the wellbore 116 via the annulus 126, those skilled in the art will readily appreciate that the fluid processing unit 128 can be arranged at any other location in the drilling system 100 to facilitate its proper function, without departing from the scope of the disclosure.

Other additives can be added to the fluid 122 via one or more mixing hoppers 134 communicably coupled to or otherwise in fluid communication with one or more retention pits 132. One or more fluids, components of fluids, and/or additives can be added to the fluid 122 at any other location in the drilling system 100. Moreover, the retention put 132 can be representative of one or more fluid storage facilities and/or units where the additives can be stored, reconditioned, produced, mixed, and/or regulated until added to the fluid 122. It is to be recognized that the retention pit 132 and/or the mixing hopper 134 are merely exemplary in nature and various additional components can be present that have not necessarily been depicted in FIG. 1 in the interest of clarity. Non-limiting additional components that can be present the drilling system 100 include, but are not limited to, containers, mixing devices, supply hoppers, valves, condensers, adapters, joints, gauges, sensors, pumps, compressors, pressure controllers, pressure sensors, flow rate controllers, flow rate sensors, temperature sensors, or temperature control devices.

The retention pit 132 and/or the mixing hopper 134 can contain one or more barrier pill fluids that can be produced, stirred, mixed, stored, delivered, or any combination thereof within the retention pit 132 and/or the mixing hopper 134. For example, the fluid 122 can be or include a barrier pill fluid that contains one or more viscoelastic surfactants (VESs) and one or more aqueous fluids, such as a brine. In some examples, the barrier pill fluid that contains one or more acid precursor and/or one or more encapsulated salts.

Each of the components of the barrier pill fluid can be combined to produce the barrier pill fluid prior to placing the barrier pill fluid into the wellbore 116. For example, the barrier pill fluid is produced offsite of the drilling system 100 and subsequently introduced or otherwise added into the retention pit 132 and/or the mixing hopper 134. In other examples, one or more components of the barrier pill fluid are mixed or otherwise combined to produce the barrier pill fluid onsite of the drilling system 100, such as in the retention pit 132 and/or the mixing hopper 134. Thereafter, the barrier pill fluid is stored until ready to be used in the wellbore 116. Alternatively, one or more components of the barrier pill fluid are mixed or otherwise combined to produce the barrier pill fluid downhole the wellbore 116. The barrier pill fluid forms a barrier pill (not shown) in the wellbore 116 and used to separate two or more fluids.

The disclosed barrier pills may directly or indirectly affect the drilling system 100. For example, as described above, the barrier pills can be introduced into the wellbore 116 in connection with removing the drill string 108 from the wellbore. This facilitates the introduction of a heavy mud cap (not shown) to help maintain the hydrostatic pressure of the fluid 122 at the bottom of the wellbore 116.

Embodiments provide methods and systems for separating different fluids in a wellbore and managing pressure, for example, while drilling. The separated fluids, including the fluid 122, can be or include, but are not limited to, drilling fluids, treatment fluids, and/or formation fluids. As used herein, the term "drilling fluid" refers to any fluid that is circulated in the wellbore during a drilling operation including fluids which may, for example, be used to lubricate the drill or remove cuttings from the wellbore. As used herein, the term "treatment fluid" refers to any fluid used in a subterranean operation in conjunction with achieving a desired function and/or for a desired purpose. Use of these terms does not imply any particular action by the treatment fluid. Illustrative treatment operations can include, for example, fracturing operations, gravel packing operations, acidizing operations, scale dissolution and removal, consolidation operations, and the like. As used herein, the term "formation fluid" refers to any fluid that is naturally present in a subterranean formation. In certain embodiments, the separated fluids may have different densities, and the fluid having the greater density can be in the upper or lower half of the fluid column.

In particular, a barrier pill is used, among other purposes, to separate the different fluids present in a wellbore and to manage pressure while drilling. In certain embodiments, the barrier pill can include a thixotropic fluid. In certain embodiments, the barrier pill can be placed on top of a fluid or between the different fluid layers and forms a physical barrier between them. The barrier pill has sufficient mechanical properties to prevent the two fluids from mixing (or reduce the degree to which they mix) and, in some embodiments, to prevent a heavier fluid that is placed at a relatively upper portion of the wellbore from settling to the lower portion of the wellbore.

For example, in one or more embodiments, a method for separating fluids with the barrier pill in the wellbore within the downhole environment includes introducing a first fluid into the wellbore, introducing a barrier pill fluid into the wellbore to form the barrier pill within the wellbore, and introducing a second fluid into the wellbore. The barrier pill separates the first fluid and the second fluid. The first fluid and the second fluid can have the same density or different densities. In one or more examples, the first fluid has a density that is less than a density of the second fluid, and the first fluid is further downhole than the second fluid. As such, the barrier pill separates the denser fluid that is above the less dense fluid. Each of the first fluid and the second fluid can independently be or include one or more of a drilling fluid, a treatment fluid, a weighted fluid, a production fluid, a formation fluid, a fracturing fluid, other downhole or annular fluids, or any combination thereof.

Among the many potential advantages to the methods and compositions, only some of which are alluded to herein, the methods, compositions, and systems may improve the gel strength of the barrier pill. Additionally, the methods and compositions may make the barrier pill less degradable in wellbore conditions, including wellbore conditions that have a high degree of salinity. It is also believed that certain embodiments may result in an increase in tolerance to contamination and an increase in tolerance to temperature variation. These improvements could be used in conjunction with conventional equipment (e.g., downhole deployment valves or snubbing units), or they could be substituted for such conventional equipment. The improvements could be used in underbalanced and managed pressure drilling and completion operations, and/or in other types of well operations.

The barrier pills used in the methods and systems can include any aqueous base fluid known in the art. The term "base fluid" refers to the major component of a fluid (as opposed to components dissolved and/or suspended therein), and does not indicate any particular condition or property of that fluid, such as a mass, an amount, or a pH value. Aqueous fluids that can be suitable for use in the methods and systems can include water from any source. Such aqueous fluids can include fresh water, salt water (e.g., water containing one or more salts dissolved therein), brine (e.g., saturated salt water), seawater, or any combination thereof. In most embodiments, the aqueous fluids contain one or more ionic species, such as those formed by salts dissolved in water. For example, seawater and/or produced water can include a variety of divalent cationic species dissolved therein.

The barrier pill can include an aqueous fluid and a viscoelastic surfactant (VES). The barrier pills normally are made by mixing appropriate amounts of one or more viscoelastic surfactants, such as anionic, cationic, nonionic and zwitterionic surfactants, with an aqueous fluid. The viscosity of barrier pills can be attributed to the physical associations of the one or more viscoelastic surfactants, including the three dimensional structure that can be formed by the one or viscoelastic surfactants when these components when mixed. When the concentration of the one or more viscoelastic surfactants in a viscoelastic fluid exceeds a critical concentration, and in most cases in the presence of an electrolyte, surfactant molecules aggregate into species such as micelles, which can interact to form a network exhibiting elastic behavior. As used herein, the term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the surfactant molecules (or ions) associate to form micelles of a certain micellar structure (e.g., rod like, wormlike, or vesicles, which are referred to herein as "viscosifying micelles") that, under certain conditions (e.g., concentration or ionic strength of the fluid) are capable of, inter alia, imparting increased viscosity to a particular fluid and/or forming a gel.

Certain viscosifying micelles may impart increased viscosity to a fluid such that the fluid exhibits viscoelastic behavior (e.g., shear thinning properties) due, at least in part, to the association of the surfactant molecules contained therein. Viscoelasticity is the property of a material that exhibits both viscous and elastic characteristics when undergoing deformation. Viscous materials resist shear flow and strain linearly with time when a stress is applied to the material. Elastic materials strain instantaneously when a stress is applied and quickly return to the original state once the stress is removed. A material is considered viscoelastic where the relationship between stress and strain depends on time. Measuring the viscoelasticity of a fluid can help determine the suspending capabilities of the fluid. As used herein, the terms "barrier pill" and "barrier pill fluid" refer to a fluid and/or gel that is introduced into a wellbore to keep two other fluid layers substantially separated and exhibits or is capable of exhibiting viscoelastic behavior due, at least in part, to the association of surfactant molecules contained therein to form viscosifying micelles. As used herein the term "viscoelastic surfactant" refers to a surfactant capable of impart viscoelastic behavior to the aqueous fluid, at least in part, to the association of surfactant molecules into viscosifying micelles.

The aqueous fluid used and/or contained in the barrier pill can be from any suitable source. By way of example, the water can be sourced from fresh water, salt water (e.g., water containing one or more salts dissolved therein), brine (e.g., saturated salt water), seawater, or any combination thereof. Salt water generally can include one or more dissolved salts therein and can be saturated or unsaturated as desired for a particular application. Seawater or brines can be suitable for use in some examples. In a non-limiting example, the barrier pill can have a concentration of water in an amount of about 30 wt % to about 99 wt % based on a total weight of the barrier pill, or about 45 wt % to about 98 wt % based on a total weight of the barrier pill, or about 70 wt % to about 98 wt % based on a total weight of the barrier pill. Specific amounts of the water that can be used include, but are not limited to, 30 wt %, 40 wt %, 50 wt %, 60 wt %, 70 wt %, 80 wt %, 90 wt %, 92 wt %, 94 wt %, 95 wt %, 98 wt %, or 99 wt % based on a total weight of the barrier pill. In addition to an aqueous fluid the barrier pill can include a solvent solution, such as a solvent solution that includes ethanol and/or ethylene glycol, ranging from about 5 wt % to about 15 wt % based on a total weight of the barrier pill.

The viscoelastic surfactants included in the barrier pills can include one or more surfactants that are capable of imparting viscoelastic properties to the aqueous fluid. These viscoelastic surfactants can be zwitterionic, cationic, anionic, or amphoteric in nature, and include any number of different compounds, including, but not limited to, methyl ester sulfonates, betaines, modified betaines, sulfosuccinates, taurates, amine oxides, ethoxylated fatty amines, quaternary ammonium compounds, and combinations thereof.

In one or more examples, the viscoelastic surfactant includes, but is not limited to, a mixture containing an ammonium salt of one or more alkyl ether sulfate surfactants, one or more cocoamidopropyl betaine surfactants, one or more cocoamidopropyl dimethylamine oxide surfactants, sodium chloride and/or one or more other salts, and water. In other examples, the viscoelastic surfactant includes, but is not limited to, a mixture containing an ammonium salt of one or more alkyl ether sulfate surfactants, one or more cocoamidopropyl hydroxysultaine surfactants, one or more cocoamidopropyl dimethylamine oxide surfactants, sodium chloride and/or one or more other salts, and water. In other examples, the viscoelastic surfactant includes, but is not limited to, a mixture containing one or more ethoxylated alcohol ether sulfate surfactants, one or more alkyl or alkene amidopropyl betaine surfactants, one or more alkyl or alkene dimethylamine oxide surfactants, and water. In other examples, the viscoelastic surfactant includes, but is not limited to, a mixture containing one or more alpha-olefinic sulfonate surfactants, one or more betaine surfactants, and water.

The viscoelastic surfactant can be present in the barrier pill in an any suitable amount to provide the desired properties (e.g., viscosity), including, but not limited to, an amount of about 0.1 wt %, about 0.5 wt %, about 1 wt %, about 2 wt %, about 3 wt %, about 4 wt %, or about 5 wt % to about 6 wt %, about 8 wt %, about 10 wt %, about 12 wt %, about 15 wt %, about 18 wt %, about 20 wt %, about 25 wt %, about 30 wt %, or about 40 wt %, based on the total weight of the barrier pill. For example, the viscoelastic surfactant can be present in the barrier pill in an amount of about 0.1 wt % to about 40 wt %, about 0.1 wt % to about 30 wt %, about 0.1 wt % to about 20 wt %, about 0.1 wt % to about 10 wt %, about 0.1 wt % to about 8 wt %, about 0.1 wt % to about 5 wt %, about 0.1 wt % to about 3 wt %, about 0.1 wt % to about 1 wt %, about 1 wt % to about 30 wt %, about 1 wt % to about 20 wt %, about 1 wt % to about 10 wt %, about 1 wt % to about 8 wt %, about 1 wt % to about 5 wt %, about 1 wt % to about 3 wt %, about 2 wt % to about 30 wt %, about 2 wt % to about 20 wt %, about 2 wt % to about 10 wt %, about 2 wt % to about 8 wt %, about 2 wt % to about 5 wt %, about 2 wt % to about 3 wt %, about 3 wt % to about 30 wt %, about 3 wt % to about 20 wt %, about 3 wt % to about 10 wt %, about 3 wt % to about 8 wt %, about 3 wt % to about 6 wt %, about 3 wt % to about 5 wt %, based on the total weight of the barrier pill. Specific amounts of the viscoelastic surfactant that can be used include, but are not limited to, about 0.1 wt %, about 1 wt %, about 2 wt %, about 4 wt %, about 6 wt %, about 8 wt %, about 10 wt %, about 12 wt %, about 14 wt %, about 16 wt %, about 18 wt %, or about 20 wt %, based on a total weight of the barrier pill.

The aqueous fluid includes one or more brines. The aqueous fluid is an aqueous solution and can include one or more salts contained therein. Other aqueous fluids, such as drilling fluids, wellbore fluids, or brines, contain salts and can be combined with the aqueous fluid. The brine in the aqueous fluid can include, but is not limited to, fresh water, sea water, water containing organic and/or inorganic dissolved salts, liquids containing water-miscible organic compounds, solvents, or any combination thereof. For example, the brine can be formulated with mixtures of desired salts in fresh water. Salts dissolved in the brine can include, but are not limited to, alkali metal and/or alkaline earth halides, hydroxides, and/or carboxylates, for example.

The amount and concentration of the dissolved salt may contribute to the formation of the viscosifying micelles by the viscoelastic surfactant. The salt may also be used to increase the density of the barrier pill. Suitable dissolved salts can include monovalent salts, divalent salts, trivalent salts, or any combination thereof. The brine in the aqueous fluid can include, but is not limited to, one or more salts of sodium, calcium, aluminum, magnesium, potassium, strontium, and lithium, salts of chlorides, bromides, carbonates, iodides, chlorates, bromates, formates, nitrates, oxides, phosphates, sulfates, silicates, and fluorides. Salts that can be incorporated in the aqueous fluid include any one or more of those contained in natural seawater or any other organic or inorganic dissolved salts. Additionally, brines used in the aqueous fluid can be natural or synthetic brines, with synthetic brines tending to be much simpler in constitution. Exemplary salts can be or include, but are not limited to, one or more of sodium chloride, sodium bromide, potassium chloride, potassium bromide, lithium chloride, lithium bromide, cesium chloride, cesium bromide, calcium chloride, calcium bromide, zinc chloride, zinc bromide, magnesium chloride, magnesium bromide, potassium formate, cesium formate, sodium formate, lithium formate, ammonium chloride, ammonium bromide, one or more organic cation salts (e.g., tetramethyl ammonium chloride), choline chloride, sodium hydrogen carbonite, potassium hydrogen carbonite, cesium hydrogen carbonite, sodium acetate, potassium acetate, hydrates thereof, or any combinations thereof.

The salt can be in any amount or concentration such as unsaturated, saturated, supersaturated, and saturated with additional solids. For example, the salt can be in an amount of about 1 wt % to about 85 wt % based on a total weight of the aqueous fluid. The brine in the aqueous fluid includes a concentration of salt from about 1 wt %, about 2 wt %, about 3 wt %, about 4 wt %, about 4.5 wt %, about 5 wt %, about 6 wt %, about 7 wt %, about 8 wt %, about 9 wt %, about 10 wt % to about 12 wt %, about 15 wt %, about 18 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, or more, relative to the total weight of the brine. For example, the brine includes a concentration of salt from about 3 wt % to about 50 wt %, about 5 wt % to about 50 wt %, about 7 wt % to about 50 wt %, about 10 wt % to about 50 wt %, about 15 wt % to about 50 wt %, about 20 wt % to about 50 wt %, about 25 wt % to about 50 wt %, about 30 wt % to about 50 wt %, about 3 wt % to about 40 wt %, about 5 wt % to about 40 wt %, about 7 wt % to about 40 wt %, about 10 wt % to about 40 wt %, about 15 wt % to about 40 wt %, about 20 wt % to about 40 wt %, about 25 wt % to about 40 wt %, about 30 wt % to about 40 wt %, about 3 wt % to about 30 wt %, about 5 wt % to about 30 wt %, about 7 wt % to about 30 wt %, about 10 wt % to about 30 wt %, about 15 wt % to about 30 wt %, about 20 wt % to about 30 wt %, or about 25 wt % to about 30 wt %, relative to the total weight of the brine.

The barrier pill can include one or more density reducing additives. Density-reducing additives can be included in the barrier pill to reduce the density as can be desired for a particular application. Suitable density reducing additives can include, but are not limited to, hollow glass spheres. Density reducing additives can be present in any suitable amount, including an amount of about 5 wt % to about 40 wt %, or about 10 wt % to about 15 wt % based on a total weight of the barrier pill.

The barrier pill can include one or more pH-adjusting agents. The pH-adjusting agent can include an acidic material for lowering the pH of the barrier pill, or a basic material capable of raising the pH of the barrier pill. Exemplary acidic pH-adjusting agents can be or include, but are not limited to one or more of hydrochloric acid, hydrofluoric acid, hydrobromic acid, sulfuric acid, phosphoric acid, nitric acid, acetic acid, formic acid, citric acid, salts thereof, complexes thereof, or any combination thereof. Exemplary basic pH-adjusting agents can be or include, but are not limited to one or more of triethanolamine, lime, sodium hydroxide, ammonium hydroxide, potassium hydroxide, magnesium hydroxide, one or more metal alkali salts, or any combination thereof. The pH-adjusting agent can be present in any suitable amount. A suitable amount of the pH-adjusting agent can be present in an amount including, but not limited to, about 0.1 wt % to about 10 wt % or about 1% wt % to about 5 wt %, based on a total weight of the barrier pill.

In certain embodiments, the barrier pills used in the methods and systems as described herein can include any number of additional additives. Examples of such additional additives include, but are not limited to, corrosion inhibitors, oxygen scavengers, hydrogen sulfide scavengers, carbon dioxide scavengers, and scale inhibitors.

In addition, the plug formed in the wellbore by the barrier pill can be self-breaking. As the barrier pill may have the capability of breaking when contacted by reservoir fluids (e.g., hydrocarbons, such as oil), workover or cleanup operations can be reduced and potentially eliminated. Rather, the barrier pill may remain in the wellbore preventing undesirable fluid loss into the subterranean formation until the well be placed into production. At that time, the barrier pill can be contacted by reservoir fluids causing the barrier pill to break, for example, due to disruption of the micelles formed by the viscoelastic surfactants. This property can be quantified measuring the viscosity of barrier pill samples at different shear rates contaminated with different concentrations of hydrocarbons, such as heavy oil, light oil, or paraffins.

Another property that can be exhibit by the barrier pill can be self-healing. The self-healing property of the barrier pill can be observed as the barrier pill may reform a continuous three-dimensional structure after it may have been broken due to high shear forces. This can beneficial, for example, during perforation operations, as the barrier pill in the perforation path can be broken due to high shear, but may reform after the shear has dissipated such the three-dimensional structure of the barrier pill from the viscoelastic surfactants can be reformed, thus reducing or eliminating the mixture of two or more fluids having different densities within the wellbore. For example, after shearing and disruption by perforating, the barrier pill in the perforation path may recover at least 90% or more of its viscosity in 1 minute or less, including, but not limited to, recovery of at least 95%, 99% or more of its viscosity in 1 minute, 40 seconds, 20 seconds, 10 seconds, 5 seconds, 2 seconds, or less. In addition, after shearing and disruption by perforating, the barrier pill in the perforation path may recover at least 90% of its loss modulus and storage modulus in 1 minutes or less, including, but not limited to, recovery of at least 95%, 99% or more of its loss modulus and storage modulus in 1 minute, 40 seconds, 20 seconds, 10 seconds, 5 seconds, 2 seconds, or less. The self-healing property of barrier pills can be quantified using a shear recovery test and a gel recovery test, where the recovery of viscosity and gel properties (G", G") are measured after fast shear changes. The shear recovery and gel recovery tests can be performed using any suitable rheometer, including an R-3 rheometer from TA Instruments having a coaxial geometry (989842). In the shear recovery test, the following steps can be performed: 1) shearing at constant shear rate of 0.1 $s^{-1}$ for 120 seconds; 2) application of constant shear rate of 100 $s^{-1}$ for 120 seconds; and 3) decrease shear rate to 0.1 $s^{-1}$, in which remains for 240 seconds, in order to evaluate the time required for the system to recover its viscosity. In the gel recovery tests, the following steps can be performed: 1) evaluation in oscillatory mode with constant frequency of 1.0 Hz and stress amplitude of 1.0 Pa for 300 seconds; 2) application of a constant shear rate of 100 $s^{-1}$ for 120 seconds; and 3) evaluation in oscillatory mode under the same initial conditions in order to evaluate the time required for the system to recover its gel characteristics.

In another embodiment, where the barrier pill is used as a fluid loss pill above the perforating fluid, the perforating fluid may further include a water-wetting surfactant. After perforating, the perforating fluid may leak off into the formation through the perforation channels. The water-wetting surfactant may function to stimulate the reservoir and increase initial production by adhering to the formation rock and changing the surface wettability. The surface can be highly water wet after treatment, and the water wet rocks may flow oil better. By placing the barrier pill in the wellbore above the perforating fluid, the barrier pill may flow down to the perforation channels as the perforating fluid is lost into the formation, such that the barrier pill forms a plug in the perforation channels reducing or even eliminating fluid loss through the perforation channels.

In one or more embodiments, the barrier pill contains one or more acid precursors that generate in situ one or more organic acids in the downhole environment. The acid precursor is or includes one or more acid precursors. Once the barrier pill is flowed to or otherwise introduced to the predetermined location within the downhole environment, the acid precursor is hydrolyzed to generate the organic acid. The acid is formed or otherwise produced from the acid precursor via hydrolyzing the acid precursor. The generated acid is used to break or degrade the barrier pill once use of the barrier pill is complete. Once broken, the viscosity of the barrier pill is decreased and the fluids separated by the barrier pill and the remnants of the barrier pill can be combined to form a mixed fluid.

After placing the barrier pill containing the acid precursor into the subterranean formation or environment, an acid is produced from the acid precursor and acidizing the subterranean formation (e.g., the near-wellbore and near-fracture zone areas) with the formed acid is initiated. The forming of the acid from the acid precursor can include allowing the acid precursor to remain under subterranean conditions surrounding the placed barrier pill for a sufficient time to form the acid from the acid precursor. For example, for hydrolyzable acid precursors, forming the acid from the acid precursor can include hydrolyzing the acid precursor to form the acid. In one or more embodiments, the barrier pill can be a relatively neutral solution containing one or more acid precursors that are activated downhole to produce in situ the acid, reduce the pH of the treatment or other downhole fluid, dissolve plugs, filter cakes, or carbonate surfaces, and increase production of the formation, well, or other feature within the downhole environment.

The acid precursor can be or include, but is not limited to, one or more of substituted or unsubstituted ($C_1$-$C_{20}$)hydrocarbyl esters of substituted or unsubstituted ($C_1$-$C_{20}$)alkanoic acids, homo- or hetero-anhydrides of substituted or unsubstituted ($C_1$-$C_{20}$)alkanoic acids, or any combination thereof. More specifically, in some embodiments, the acid precursor can be or include, but is not limited to, one or more of ($C_1$-$C_5$)alkyl esters of substituted or unsubstituted ($C_1$-$C_5$)alkanoic acids, ($C_1$-$C_5$)alkyl esters or anhydrides of mono- or poly-hydroxy substituted ($C_1$-$C_5$)alkanoic acids, or any combination thereof. In some examples, the acid precursor can be or include substituted or unsubstituted ($C_1$-$C_{20}$)hydrocarbyl esters or anhydrides of at least one of formic acid, acetic acid, lactic acid, glycolic acid, propionic acid, or any combination thereof. For example, the acid precursor can be or include one or more polyethylene glycol di($C_1$-$C_5$)alkanoates. In other examples, the acid precursor can be or include at least one of diethylene glycol diformate, ethylene glycol monoformate, ethyl lactate, ethyl formate, methyl formate, glycerin diacetate, methyl lactate, salts thereof, or any combination thereof.

In some embodiments, the acid precursor is triggered or activated to produce the acid in the downhole environment at a specified temperature. The temperature can be about 50° F., about 60° F., about 70° F., about 80° F., about 90° F., about 100° F., about 125° F., about 150° F., about 200° F., or about 250° F. to about 300° F., about 350° F., about 400° F., about 450° F., about 500° F., or greater. For example, the temperature can be about 80° F. to about 500° F., about 100° F. to about 500° F., about 125° F. to about 500° F., about 150° F. to about 500° F., about 175° F. to about 500° F., about 200° F. to about 500° F., about 200° F. to about 450° F., about 200° F. to about 400° F., about 250° F. to about 400° F., about 250° F. to about 350° F., about 275° F. to about 325° F., about 80° F. to about 400° F., about 80° F. to about 350° F., about 80° F. to about 300° F., about 80° F. to about 250° F., about 80° F. to about 200° F., or about 80° F. to about 150° F.

The forming of the acid from the acid precursor can include allowing the acid precursor to remain under subterranean conditions surrounding the placed barrier pill for a time of at least about 1 half-lives of a hydrolysis reaction of the acid precursor under the subterranean conditions surrounding the placed barrier pill to form the acid from the acid precursor, or for about 1, about 2, about 3, about 4, about 5, about 6, about 7, about 8, about 9, or about 10 half-lives to about 12, about 14, about 16, about 18, about 20, about 25, about 30, about 40, about 50, about 75, about 100, about 125, about 150, about 175, or about 200 half-lives of a hydrolysis reaction of the acid precursor under the subterranean conditions surrounding the placed barrier pill to form the acid from the acid precursor.

In some embodiments, the acid is produced from the acid precursor by allowing the acid precursor to remain in place in the downhole environment for about 4 hours, about 5 hours, about 6 hours, about 8 hours, about 10 hours, about 12 hours, or about 15 hours to about 18 hours, about 20 hours, about 1 day, about 1.5 days, about 2 days, about 2.5 days, about 3 days, about 4 days, about 5 days, about 7 days, about 10 days, about 15 days, or longer, after introducing the barrier pill into the downhole environment. For example, the acid is produced from the acid precursor by allowing the acid precursor to remain in place in the downhole environment for about 4 hours to about 15 days, about 4 hours to about 10 days, about 4 hours to about 7 days, about 6 hours to about 10 days, about 6 hours to about 7 days, about 6 hours to about 5 days, about 6 hours to about 4 days, about 6 hours to about 3 days, about 6 hours to about 2.5 days, about 6 hours to about 2 days, about 6 hours to about 1.5 days, about 6 hours to about 1 day, about 6 hours to about 18 hours, about 6 hours to about 12 hours, about 12 hours to about 15 days, about 12 hours to about 10 days, about 12 hours to about 7 days, about 12 hours to about 5 days, about 12 hours to about 4 days, about 12 hours to about 3 days, about 12 hours to about 2.5 days, about 12 hours to about 2 days, about 12 hours to about 1.5 days, about 12 hours to about 1 day, or about 12 hours to about 18 hours after introducing the barrier pill into the downhole environment.

In certain embodiments, the barrier pill can also include one or more alkaline agents. Exemplary alkaline agents can be or include, but are not limited to, one or more of quick lime or calcium oxide (CaO), calcium hydroxide, lithium hydroxide, sodium hydroxide, potassium hydroxide, cesium hydroxide, ammonium hydroxide, hydrates thereof, or any combination thereof. In certain embodiments, the alkaline agent is present in the barrier pill in a concentration up to about 1 pound per about 1 barrel (about 42 gallons or about 159 liters). In certain embodiments, the alkaline agent is present in the barrier pill in a concentration of about 0.25 to about 0.5 pounds per barrel. In some embodiments, the alkaline agent is added to the barrier pill in an amount to achieve or greater than 8, such as about 9, about 9.5, about 10, about 10.5, about 11, about 11.5, about 12, or greater.

In certain embodiments, the barrier pill can include one or more weighting agents and/or one or more encapsulated salts. Exemplary weighting agents can be or include, but are not limited to, one or more of barite, calcium carbonate, iron oxide, illmenite, manganese tetroxide, magnesium carbonate, iron carbonate, or any combination thereof. The weighting agent can be added to the barrier pill to adjust the density of the barrier pill. For example, a greater density (and a higher concentration of weighting agent) can be used when the barrier pill will be introduced into a wellbore where there is a higher formation fluid pressure. In certain embodiments, the density of the barrier pill may range from about 8 pounds per gallon to about 22 pounds per gallon.

In other embodiments, the barrier pill can include one or more encapsulated salts. The encapsulated salt can include one or more of the salts or brines disclosed above. The salt can be in a solid form, a liquid form, or a combination of solid and liquid form (e.g., super saturated solution that contains dissolved and precipitated salt). The salt can be at least partially coated, or completely coated, by one or more polymeric materials, such as a degradable polymer. The polymer can be or include, but is not limited to, one or more natural polymers, one or more synthetic polymers, or any combination thereof. In one or more examples, chitosan is used to partially or completely coated or encapsulate the salt. The encapsulating polymer can be dissolved, degraded, or deteriorated at a predetermined time to release the salt into the barrier pill. The released salt can be used to break the barrier pill once use of the barrier pill is complete.

In certain embodiments, the barrier pills used in the methods and systems optionally can include any number of additional additives. Examples of such additional additives include, but are not limited to, corrosion inhibitors, pH buffers, oxygen scavengers, hydrogen sulfide scavengers, polymeric viscosifiers, fluid loss control agents, surfactants, and hydrate suppressants.

The barrier pills can be prepared by any suitable method. In some embodiments, the barrier pills can be prepared on the job site. As an example of such an on-site method, the optional additional components can be added to the barrier pill during pumping. In other embodiments, the barrier pills can be prepared remotely and transported to the job site.

In some embodiments provides methods for using the barrier pills to use in connection with carrying out a variety of subterranean treatments, including but not limited to, hydraulic fracturing treatments, acidizing treatments, and drilling operations. In some embodiments, the barrier pills can be used in connection with treating a portion of a subterranean formation, for example, in acidizing treatments such as matrix acidizing or fracture acidizing. In certain embodiments, a barrier pill fluid can be introduced into a subterranean formation and form the barrier pill. In some embodiments, the barrier pill fluid can be introduced into a wellbore that penetrates the subterranean formation.

In some embodiments provides methods for using the barrier pill. In one embodiment, a barrier pill can be used in connection with managed pressure drilling. During managed pressure drilling, the hydrostatic pressure of the drilling fluid can be regulated with the use of back-pressure pumps in combination with the drilling fluid density to balance the high pressure of formation fluids in the subterranean formation. The back pressure is supplied by a surface pump and is held in place by specialized rotating head assembly that provides a seal around the drill-pipe allowing the system to be pressurized. However, when the operator needs to remove the drill string (for example, to change the drill-bit or conduct other maintenance), the operator will no longer have the seal of the rotating head to control back pressure and so the operator may often place a high weight mud-cap on top of the drilling fluid to maintain the pressure of the column. A barrier pill can be used to keep the two layers separate. If the barrier pill was not used, the heavier mud may displace the drilling fluid and sink to the bottom of the wellbore or the heavier mud would commingle with the active drilling fluid resulting in the need to dilute and recondition fluid after tripping.

In one embodiment, the following steps can be used to place the barrier pill in the wellbore. First, a section of the wellbore is drilled or stripped out while using a managed pressure drilling control system (where the drilling fluid is maintained at a high pressure to balance the pressure of formation fluids). Second, about 250 feet of the barrier pill is placed in the wellbore using a pump. Third, the bottom of the drill string is pulled up about 20 feet above top of the barrier pill and the gel is allowed to form for about 30 minutes. Fourth, a high density mud cap is placed above the barrier pill by displacing the drilling fluid. Finally, the operator may trip out of wellbore without using the managed pressure drilling control system.

According to this embodiment, when the operator is ready to resume drilling operation, the following steps can be used to remove the barrier pill from the wellbore: First, the operator trips back to top of barrier pill and activates the managed pressure drilling control system. Second, the mud cap is displaced with drilling fluid. Third, the wellbore pressure is controlled with the managed pressure drilling system while rotating and/or washing through the barrier pill to destroy the gel plug and incorporate the pill into the active system. Once the barrier pill has been removed, the operator may continue drilling forward or perform casing operations.

In addition to the embodiments described above, embodiments of the present disclosure further relate to one or more of the following paragraphs:

1. A method for separating fluids with a barrier pill in a wellbore within a downhole environment, comprising: introducing a barrier pill fluid into the wellbore containing a first fluid to form the barrier pill on top of the first fluid in the wellbore, wherein the barrier pill comprises: a viscoelastic surfactant; and an aqueous fluid; and introducing a second fluid into the wellbore, wherein the barrier pill separates the first fluid and the second fluid.

2. A method for separating fluids with a barrier pill in a wellbore within a downhole environment: introducing a barrier pill fluid into the wellbore containing a first fluid to form the barrier pill on top of the first fluid in the wellbore, wherein the barrier pill comprises: a viscoelastic surfactant; an acid precursor; and an aqueous fluid; and introducing a second fluid into the wellbore, wherein the barrier pill separates the first fluid and the second fluid, and wherein the first fluid and the second fluid have different densities.

3. A barrier pill comprising: a viscoelastic surfactant comprising a methyl ester sulfonate, a betaine, a sulfosuccinate, a taurate, an amine oxide, an ethoxylated fatty amine, a quaternary ammonium compound, or any combination thereof; an acid precursor; and an aqueous fluid.

4. A barrier pill comprising: a viscoelastic surfactant comprising a methyl ester sulfonate, a betaine, a sulfosuccinate, a taurate, an amine oxide, an ethoxylated fatty amine, a quaternary ammonium compound, or any combination thereof; an acid precursor; and a brine, the brine comprising water and about 5 wt % to about 50 wt % of a salt.

5. The method or the barrier pill according to any one of paragraphs 1-4, wherein the aqueous fluid comprises a brine comprising water and about 5 wt % to about 50 wt % of a salt.

6. The method or the barrier pill according to any one of paragraphs 1-5, wherein the brine comprises about 15 wt % to about 50 wt % of the salt.

7. The method or the barrier pill according to any one of paragraphs 1-6, wherein the first fluid and the second fluid have different densities.

8. The method or the barrier pill according to any one of paragraphs 1-7, wherein a density of the first fluid is less than a density of the second fluid, and wherein the first fluid is further downhole than the second fluid.

9. The method or the barrier pill according to any one of paragraphs 1-8, wherein the first fluid and the second fluid are independently one or more of drilling fluids, treatment fluids, weighted fluids, production fluids, formation fluids, fracturing fluids, other downhole or annular fluids, or any combination thereof.

10. The method or the barrier pill according to any one of paragraphs 1-9, wherein the viscoelastic surfactant comprises a methyl ester sulfonate, a betaine, a sulfosuccinate, a taurate, an amine oxide, an ethoxylated fatty amine, a quaternary ammonium compound, or any combination thereof.

11. The method or the barrier pill according to any one of paragraphs 1-10, wherein the viscoelastic surfactant comprises an ammonium salt of an alkyl ether sulfate surfactant, a cocoamidopropyl dimethylamine oxide surfactant, and at least one of a cocoamidopropyl betaine surfactant, a cocoamidopropyl hydroxysultaine surfactant, or a combination thereof.

12. The method or the barrier pill according to any one of paragraphs 1-11, wherein the viscoelastic surfactant comprises an ethoxylated alcohol ether sulfate surfactant, an alkyl or alkene amidopropyl betaine surfactant, and an alkyl or alkene dimethylamire oxide surfactant.

13 The method or the barrier pill according to any one of paragraphs 1-12, wherein the viscoelastic surfactant comprises an alpha-olefinic sulfonate surfactant and a betaine surfactant.

14. The method or the barrier pill according to any one of paragraphs 1-13, wherein the barrier pill further comprises an acid precursor.

15. The method or the barrier pill of paragraph 14, wherein the acid precursor comprises: a substituted or unsubstituted $(C_1-C_{20})$hydrocarbyl ester of a substituted or unsubstituted $(C_1-C_{20})$alkanoic acid; a homo- or heteroanhydride of a substituted or unsubstituted $(C_1-C_{20})$alkanoic acid; or a combination thereof.

16. The method or the barrier pill of paragraph 14, wherein the acid precursor comprises: a $(C_1-C_5)$alkyl ester of a substituted or unsubstituted $(C_1-C_5)$alkanoic acid; a $(C_1-C_5)$alkyl ester or anhydride of a mono- or poly-hydroxy substituted $(C_1-C_5)$alkanoic acid; or a combination thereof.

17. The method or the barrier pill of paragraph 14, wherein the acid precursor comprises a substituted or unsubstituted $(C_1-C_{20})$hydrocarbyl ester or anhydride of at least one of formic acid, acetic acid, lactic acid, glycolic acid, propionic acid, or any combination thereof.

18. The method or the barrier pill of paragraph 14, wherein the acid precursor comprises at least one of diethylene glycol diformate, ethylene glycol monoformate, ethyl lactate, ethyl formate, methyl formate, glycerin diacetate, methyl lactate, or any combination thereof.

19. The method or the barrier pill according to any one of paragraphs 1-18, wherein the barrier pill further comprises an encapsulated salt.

One or more specific embodiments of the present disclosure have been described. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time-consuming, but would nevertheless be a routine undertaking of design, fabrication, and manufacture for those of ordinary skill having the benefit of this disclosure.

In the following discussion and in the claims, the articles "a," "an," and "the" are intended to mean that there are one or more of the elements. The terms "including," "comprising," and "having" and variations thereof are used in an open-ended fashion, and thus should be interpreted to mean "including, but not limited to . . . ." Also, any use of any form of the terms "connect," "engage," "couple," "attach," "mate," "mount," or any other term describing an interaction between elements is intended to mean either an indirect or a direct interaction between the elements described unless specified otherwise. In addition, as used herein, the terms "axial" and "axially" generally mean along or parallel to a central axis (e.g., central axis of a body or a port), while the terms "radial" and "radially" generally mean perpendicular to the central axis. The use of "top," "bottom," "above," "below," "upper," "lower," "up," "down," "vertical," "horizontal," and variations of these terms is made for convenience, but does not require any particular orientation of the components.

Certain terms are used throughout the description and claims to refer to particular features or components. As one skilled in the art will appreciate, different persons may refer to the same feature or component by different names. This document does not intend to distinguish between components or features that differ in name but not function.

Reference throughout this specification to "one embodiment," "an embodiment," "an embodiment," "embodiments," "some embodiments," "certain embodiments," or similar language means that a particular feature, structure, or characteristic described in connection with the embodiment can be included in one or more embodiments of the present disclosure. Thus, these phrases or similar language throughout this specification may, but do not necessarily, all refer to the same embodiment.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

The embodiments disclosed should not be interpreted, or otherwise used, as limiting the scope of the disclosure, including the claims. It is to be fully recognized that the different teachings of the embodiments discussed can be employed separately or in any suitable combination to produce desired results. In addition, one skilled in the art will understand that the description has broad application, and the discussion of any embodiment is meant only to be exemplary of that embodiment, and not intended to suggest that the scope of the disclosure, including the claims, is limited to that embodiment.

What is claimed is:

1. A method for separating fluids with a barrier pill in a wellbore within a downhole environment, comprising:
   introducing a barrier pill fluid into the wellbore containing a first fluid to form the barrier pill on top of the first fluid in the wellbore, wherein the first fluid is further downhole than the barrier pill fluid and the barrier pill comprises:
   a viscoelastic surfactant; and
   an aqueous fluid; and
   introducing a second fluid into the wellbore, wherein the barrier pill separates the first fluid and the second fluid and is further downhole than the second fluid, the density of the first fluid is less than the density of the second fluid, and wherein the second fluid comprises a drilling fluid, a production fluid, a formation fluid, a fracturing fluid, or any combinations thereof.

2. The method of claim 1, wherein the aqueous fluid comprises a brine comprising water and about 5 wt % to about 50 wt % of a salt.

3. The method of claim 2, wherein the brine comprises about 15 wt % to about 50 wt % of the salt.

4. The method of claim 1, wherein the viscoelastic surfactant comprises a methyl ester sulfonate, a betaine, a sulfosuccinate, a taurate, an amine oxide, an ethoxylated fatty amine, a quaternary ammonium compound, or any combination thereof.

5. The method of claim 1, wherein the viscoelastic surfactant comprises an ammonium salt of an alkyl ether sulfate surfactant, a cocoamidopropyl dimethylamine oxide surfactant, and at least one of a cocoamidopropyl betaine surfactant, a cocoamidopropyl hydroxysultaine surfactant, or a combination thereof.

6. The method of claim 1, wherein the viscoelastic surfactant comprises an ethoxylated alcohol ether sulfate surfactant, an alkyl or alkene amidopropyl betaine surfactant, and an alkyl or alkene dimethylamine oxide surfactant.

7. The method of claim 1, wherein the viscoelastic surfactant comprises an alpha-olefinic sulfonate surfactant and a betaine surfactant.

8. The method of claim 1, wherein the barrier pill further comprises an acid precursor.

9. The method of claim 8, wherein the acid precursor comprises:
   a substituted or unsubstituted ($C_1$-$C_{20}$)hydrocarbyl ester of a substituted or unsubstituted ($C_1$-$C_{20}$)alkanoic acid;
   a homo- or hetero-anhydride of a substituted or unsubstituted ($C_1$-$C_{20}$)alkanoic acid; or
   a combination thereof.

10. The method of claim 8, wherein the acid precursor comprises:
    a ($C_1$-$C_5$)alkyl ester of a substituted or unsubstituted ($C_1$-$C_5$)alkanoic acid;
    a ($C_1$-$C_5$)alkyl ester or anhydride of a mono- or polyhydroxy substituted ($C_1$-$C_5$)alkanoic acid; or
    a combination thereof.

11. The method of claim 8, wherein the acid precursor comprises a substituted or unsubstituted ($C_1$-$C_{20}$)hydrocarbyl ester or anhydride of at least one of formic acid, acetic acid, lactic acid, glycolic acid, propionic acid, or any combination thereof.

12. The method of claim 8, wherein the acid precursor comprises at least one of diethylene glycol diformate, ethylene glycol monoformate, ethyl lactate, ethyl formate, methyl formate, glycerin diacetate, methyl lactate, or any combination thereof.

13. The method of claim 1, wherein the barrier pill further comprises an encapsulated salt.

14. The method of claim 13, wherein the encapsulated salt comprises a salt at least partially coated by a polymeric material.

15. A method for separating fluids with a barrier pill in a wellbore within a downhole environment:
    introducing a barrier pill fluid into the wellbore containing a first fluid to form the barrier pill on top of the first fluid in the wellbore, wherein the barrier pill comprises:
    a viscoelastic surfactant;
    an acid precursor; and
    an aqueous fluid; and
    introducing a second fluid into the wellbore, wherein the barrier pill separates the first fluid and the second fluid and is further downhole than the second fluid, the density of the first fluid is less than the density of the second fluid, and the second fluid comprises a drilling fluid, a production fluid, a formation fluid, a fracturing fluid, or any combinations thereof.

16. The method of claim 15, wherein the viscoelastic surfactant comprises a methyl ester sulfonate, a betaine, a sulfosuccinate, a taurate, an amine oxide, an ethoxylated fatty amine, a quaternary ammonium compound, or any combination thereof, and wherein the aqueous fluid comprises a brine comprising water and about 5 wt % to about 50 wt % of a salt.

17. The method of claim 15, wherein the acid precursor comprises:
    a substituted or unsubstituted ($C_1$-$C_{20}$)hydrocarbyl ester of a substituted or unsubstituted ($C_1$-$C_{20}$)alkanoic acid;

a homo- or hetero-anhydride of a substituted or unsubstituted $(C_1-C_{20})$alkanoic acid; or a combination thereof.

18. The method of claim 15, wherein the acid precursor comprises at least one of diethylene glycol diformate, ethylene glycol monoformate, ethyl lactate, ethyl formate, methyl formate, glycerin diacetate, methyl lactate, or any combination thereof.

19. A method of controlling pressure in a subterranean wellbore, the method comprising:

forming a fluid column in the wellbore comprising a first and a second fluid separated by a barrier pill fluid comprising a viscoelastic surfactant, an acid precursor, and an aqueous fluid, wherein the first fluid is further downhole than the barrier pill and the second fluid and a density of the second fluid is greater than a density of the first fluid, wherein the second fluid comprises a drilling fluid, a production fluid, a formation fluid, a fracturing fluid, or any combinations thereof; and controlling pressure in the well bore with the fluid column during the forming.

\* \* \* \* \*